(12) United States Patent
Fullerton

(10) Patent No.: US 8,677,457 B2
(45) Date of Patent: Mar. 18, 2014

(54) SECURITY FOR CODES RUNNING IN NON-TRUSTED DOMAINS IN A PROCESSOR CORE

(75) Inventor: Mark N. Fullerton, Austin, TX (US)

(73) Assignee: Marvell World Trade Ltd., St. Michael (BB)

( * ) Notice: Subject to any disclaimer, the term of this patent is extended or adjusted under 35 U.S.C. 154(b) by 1331 days.

(21) Appl. No.: 12/026,840

(22) Filed: Feb. 6, 2008

(65) Prior Publication Data

US 2011/0126265 A1 May 26, 2011

Related U.S. Application Data

(60) Provisional application No. 60/889,086, filed on Feb. 9, 2007.

(51) Int. Cl.
*G06F 21/00* (2013.01)

(52) U.S. Cl.
USPC .............................. 726/4; 711/152; 711/154

(58) Field of Classification Search
USPC .............................. 726/4; 711/151, 152, 154
See application file for complete search history.

(56) References Cited

U.S. PATENT DOCUMENTS

| 3,858,182 | A | | 12/1974 | Delagi et al. |
| 5,280,614 | A | * | 1/1994 | Munroe et al. ............... 718/107 |
| 2005/0172138 | A1 | * | 8/2005 | Ezzat ............................ 713/189 |
| 2005/0188173 | A1 | * | 8/2005 | Hasbun et al. ............... 711/203 |
| 2006/0288130 | A1 | * | 12/2006 | Madukkarumukumana et al. .............................. 710/22 |

FOREIGN PATENT DOCUMENTS

| FR | EP1331539 | 7/2003 |
| WO | WO03/090052 | 10/2003 |

OTHER PUBLICATIONS

Wahbe, Robert, et al. "Efficient software-based fault isolation." ACM SIGOPS Operating Systems Review. vol. 27. No. 5. ACM, 1994.*
Fraser, Keir, et al. "Reconstructing I/O." Technical report. University of Cambridge, Computer Laboratory (2004).*
Notification of Transmittal of the International Search Report and The Written Opinion of The International Searching Authority, or the Declaration dated Jul. 18, 2008 in reference to PCT/US2008/001668.
Intel Corporation: "Intel Architecture Software Developer's Manual vol. 3: System Programming" 1999, XP002486470; Chapter 6; pp. 6-1 through 6-20.
Intel Corporation "Intel Architecture Software Developer's Manual vol. 1: Basic Architecture" 1999, XP002486471; Chapter 10; pp. 10-1 through 10-7.

* cited by examiner

*Primary Examiner* — Vu Le
*Assistant Examiner* — Tracy Mangialaschi

(57) ABSTRACT

A method and apparatus configure a trusted domain and a plurality of isolated domains in a processor core. Each isolated domain is assigned a unique domain identifier. One or more resources are associated with each isolated domain. The associations are stored as permissions to access physical addresses of resources. Code to be executed by a hardware device is assigned to one of the isolated domains. The domain identifier for the assigned isolated domain is written to the hardware device. When the hardware device executes the code, each instruction is logically tagged with the domain identifier written to the hardware device. An instruction includes request to access a physical address. The hardware device compares the domain identifier of the instruction with the permissions. If the permissions allow the domain identifier to access the physical address, then access to the resource at the physical address is allowed. Access is otherwise blocked.

27 Claims, 4 Drawing Sheets

SECURITY FOR CODES RUNNING IN NON-TRUSTED DOMAINS IN A PROCESSOR CORE

CROSS-REFERENCE TO RELATED APPLICATIONS

This application claims the benefit of provisional Patent Application Ser. No. 60/889,086, filed Feb. 9, 2007, assigned to the assignee of the present application, and incorporated herein by reference in its entirety.

BACKGROUND

Many consumer products, such as mobile phones, set top boxes, personal digital assistants (PDA), and other systems running an operating system, are implemented with one or more processor cores. To secure a piece of code on the system, the processes that can access the code must be controlled. One approach is to partition a core into a trusted zone and a non-trusted zone. Code in the trusted zone can access all of the system resources. Code in the non-trusted zone has limited access to the system resources, as managed by code in the trusted zone. Two separate pieces of code in the non-trusted zone have the same level of permissions for access to the resources. However, it may be desirable to prevent access between the codes in the non-trusted zone. For example, an electronic wallet application and a digital rights management application may both run in the non-trusted zone. To maintain the integrity of each piece of code, access by the other needs to be controlled or prevented. A common approach is to run each piece of code in different cores. This approach, however, requires extra hardware.

Further, system resource access permissions are typically defined based on the virtual address space for the resources. Once permission for a piece of code is verified, the virtual address is translated to the physical address via a look-up table (LUT). However, this security mechanism is software based and may be bypassed or corrupted by a variety of means, including the direct use of the physical address of a resource directly, hence bypassing the virtual address translation. Thus, it may be difficult to prove the level of security provided by software based mechanisms.

Accordingly, it would be desirable to provide a method and system for providing security for codes running in non-trusted domains in a processor core.

BRIEF SUMMARY OF THE INVENTION

A method and apparatus of the invention provide security within a processor core by configuring a trusted domain and a plurality of isolated domains. Each isolated domain is assigned a unique domain identifier. One or more resources are associated with each of the isolated domains. The associations are stored as permissions to access the physical addresses of the resources. A code to be executed by a hardware device is assigned to one of the isolated domains, and the unique domain identifier for the assigned isolated domain is written to the hardware device. When the hardware device executes the code, each instruction is logically tagged with the domain identifier written to the hardware device. The instruction is identifiable as a request to access a physical address of a resource. The hardware device compares the domain identifier of the instruction with the permissions of the physical address in the instruction. If the domain identifier of the instruction has permission to access this physical address, then access to the resource at the physical address is allowed. Access to the resource is otherwise blocked. In this manner, codes assigned to different isolated domains can run independently within the same processor core without interference from each other. Further, since the permissions are configured based on the physical addresses of the resources, concerns related to software-based security mechanisms are not relevant.

DETAILED DESCRIPTION

Embodiments of the invention relates to a method and apparatus for providing security for codes running in non-trusted domains of a processor core. The following description is presented to enable one of ordinary skill in the art to make and use the invention and is provided in the context of a patent application and its requirements. Various modifications to the embodiments and the generic principles and features described herein will be readily apparent to those skilled in the art. Thus, the invention is not intended to be limited to the embodiments shown, but is to be accorded the widest scope consistent with the principles and features described herein.

The invention will be described in the context of particular methods having certain steps. However, the method operates effectively for other methods having different and/or additional steps not inconsistent with the invention.

Figure 1:
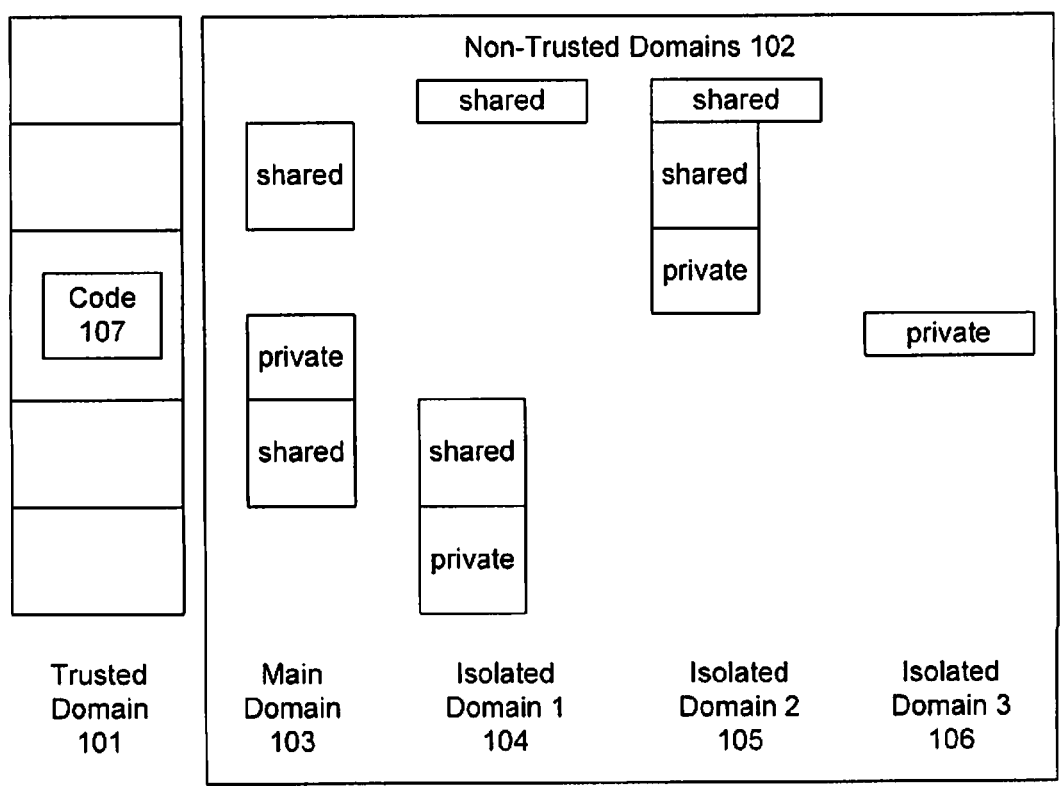
FIG. 1 illustrates an exemplary embodiment of multiple isolated domains in a processor core.

FIG. 1 illustrates an exemplary embodiment of multiple isolated domains in a processor core. As illustrated in FIG. 1, a processor core may be logically partitioned into a plurality of domains. The processor core is described in more detail below with reference to FIG. 2. A "domain", as used in this specification, is a set of system resources (such as peripherals, memory space, etc.) which exist as a group. Any or all of these resources may be shared or private. Resources are private if they are accessible only to one domain. Resources are shared if they are accessible to more than one domain. Resources are accessible at their physical addresses.

The domains may include a trusted domain 101 and a plurality of non-trusted domains 102. The non-trusted domains 102 may include a main domain 103 and a plurality of isolated domains 104-106. A "trusted domain" is a domain which is privileged and able to configure other domains. A trusted domain 101 is able to access the resources of the processor core allocated to the trusted domain and the non-trusted domains. The trusted domain 101 includes code 107 for configuring the non-trusted domains 103-106 and for managing communications between codes in the non-trusted domains 103-106.

The "main domain" 103 is a primary non-trusted domain in the processor core. The operating system may be run in the main domain 103. Code in the main domain 103 is not able to access resources which are private to the trusted domain 101 or any of the isolated domains 104-106, but is able to access the shared resources. The "isolated domains" 104-106 are non-trusted domains that have at least some private resources. There may be multiple such isolated domains 104-106, each with its own resources. The isolated domains 104-106 are only able to access their own private and shared resources, as described below. Each of the non-trusted domains 102 is assigned a unique domain identifier.

Figure 2:
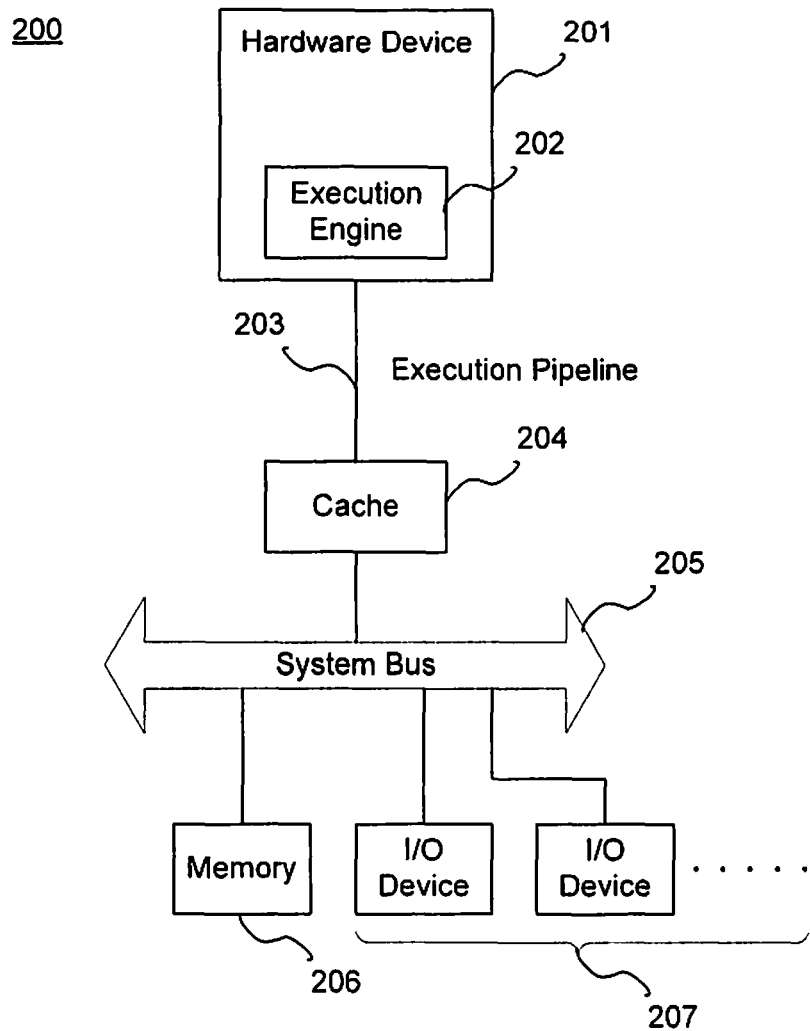
FIG. 2 is a block diagram of a processor core architecture in which embodiments of the invention may be implemented.

FIG. 2 is a block diagram of a processor core in which the invention may be implemented. The core 200 includes a hardware device 201 with an execution engine 202 for executing code. The hardware device 201 can be of any type, such as a processor, a memory controller, a universal asynchronous receiver/transmitter (UART) device, etc. When the execution engine 202 executes code, the instructions are placed in an execution pipeline 203. One or more caches 204 can be used to manage the execution of the instructions. The hardware device 201 and the cache 204 are coupled to a system bus 205. Coupled to the system bus 205 are resources, which can include memory 206 and one or more I/O devices 207. The hardware device 201 can access the resources 206-207 at their respective physical addresses.

Figure 3:
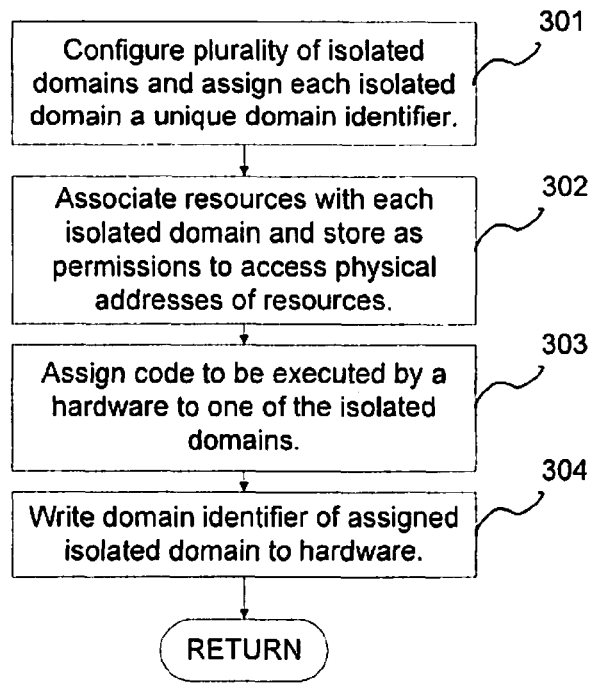
FIG. 3 is a flowchart illustrating an exemplary embodiment of the creation of isolated domains in a processor core.

FIG. 3 is a flowchart illustrating an exemplary embodiment of the creation of isolated domains in a processor core. Referring to both FIGS. 2 and 3, when the core 200 is booted, code 107 in the trusted domain 101 configures a plurality of isolated domains 104-106. Each isolated domain is assigned a unique domain identifier (step 301). One or more resources 206-207 are associated with each isolated domain. The associations are stored as permissions to access the physical addresses of the resources 206-207 (step 302). When a hardware device 201 is configured, the code to be executed by the hardware device 201 is assigned to one of the isolated domains 104-106 (step 303). The domain identifier for the assigned isolated domain is then written to the hardware device 201 (step 304).

Figure 4:
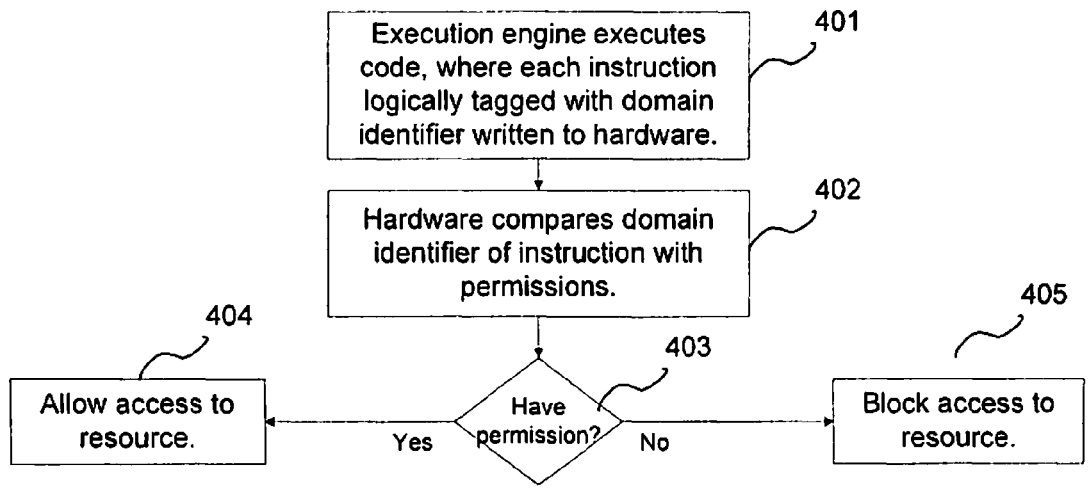
FIG. 4 is a flowchart illustrating an exemplary embodiment of the use of the domain identifier.

FIG. 4 is a flowchart illustrating an exemplary embodiment of the use of the domain identifier. When the execution engine 202 executes code in an isolated domain, each instruction is logically tagged with the domain identifier of the isolated domain written to the hardware device 201 (step 401). Logically, the domain identifier is being associated with each instruction in the execution pipeline 204, and the operations associated with this instruction have the associated domain identifier. In the exemplary embodiment, the domain identifier comprises additional bits sent on the system bus 205 along with the instruction.

During execution of the code, the hardware device 201 compares the domain identifier of the instruction with the permissions for the resources 206-207 (step 402). The instruction is identifiable as a request for access to a physical address of a resource. Thus, the hardware device 201 compares the permissions of the physical address in the instruction with the domain identifier of the instruction (step 403). If the domain identifier of the instruction has permission to access the physical address, then access to the resource at the physical address is allowed (step 404). Otherwise, access is blocked (step 405), and a "memory out of range" error is returned. The hardware device 201 can use the assigned domain identifier to check the permissions each time a resource access is attempted or at any time during the execution of the code.

For example, assume that processor core 200 includes resources, RESOURCE1 and RESOURCE2 with physical addresses ADD1 and ADD2. During configuration of the core 200, two isolated domains, DOMAIN1 and DOMAIN2 are configured and assigned unique domain identifiers (step 301). Both RESOURCE1 and RESOURCE2 are associated with DOMAIN1, while only RESOURCE1 is associated with DOMAIN2. The permissions for ADD1 are stored as giving access to DOMAIN1 and DOMAIN2, and the permissions for ADD2 are stored as giving access to DOMAIN1 (step 302).

Assume that two applications, APP1 and APP2 are configured to run on PROCESSOR1 and PROCESSOR2, respectively. During the configuration of the applications, APP1 is assigned to DOMAIN1, and APP2 is assigned to DOMAIN2 (step 303). DOMAIN1 is then written to PROCESSOR1, and DOMAIN2 is written to PROCESSOR2 (step 304).

When PROCESSOR1 executes APP1, each instruction is logically tagged with DOMAIN1 (step 401). Assume that a first instruction of APP1 includes a request to access ADD1. PROCESSOR1 checks the permissions of ADD1 and determines that DOMAIN1 has been given access (steps 402-403). The first instruction is thus allowed access to the resource at ADD1 (step 404). Assume that a second instruction of APP1 includes a request to access ADD2. PROCESSOR1 checks the permissions of ADD2 and determines that DOMAIN1 has been given access (steps 402-403). The second instruction is thus allowed to access the resource at ADD2 (step 404).

When PROCESSOR2 executes APP2, each instruction is logically tagged with DOMAIN2 (step 401). Assume that a first instruction of APP2 includes a request to access ADD1. PROCESSOR2 checks the permissions of ADD1 and determines that DOMAIN2 has been given access (steps 402-403). The first instruction is thus allowed access to the resource at ADD1 (step 404). Assume that a second instruction of APP2 includes a request to access ADD2. PROCESSOR2 checks the permissions of ADD2 and determines that DOMAIN2 has not been given access (steps 402-403). The second instruction is thus blocked from accessing the resource at ADD2 (step 405). A "memory out of range" message is returned.

In this manner, APP1 and APP2 execute in separate isolated domains and each are only able to access their own private or shared resources. Neither is able to access resources which are private to the trusted domain 101 or any of the other non-trusted domains. Neither APP1 nor APP2 need to be modified. If APP1 and APP2 is required to communicate, this communication is managed through the code 107 in the trusted domain 101.

Occasionally, the checking of the domain identifier cannot be performed in real time, such as for asynchronous events. Accesses from asynchronous events may not be related to the current isolated domain executing at an execution engine. The asynchronous event can be either from an external change, e.g., an interrupt, or from an action which took place some time previous, e.g. DMA completion at which time there was a different current domain. An isolated domain in which the event should be handled is the target isolated domain, which is identified by the domain identifier tagged on the asynchronous event. The target isolated domain can be the current isolated domain or a isolated domain different from the current isolated domain.

Figure 5:
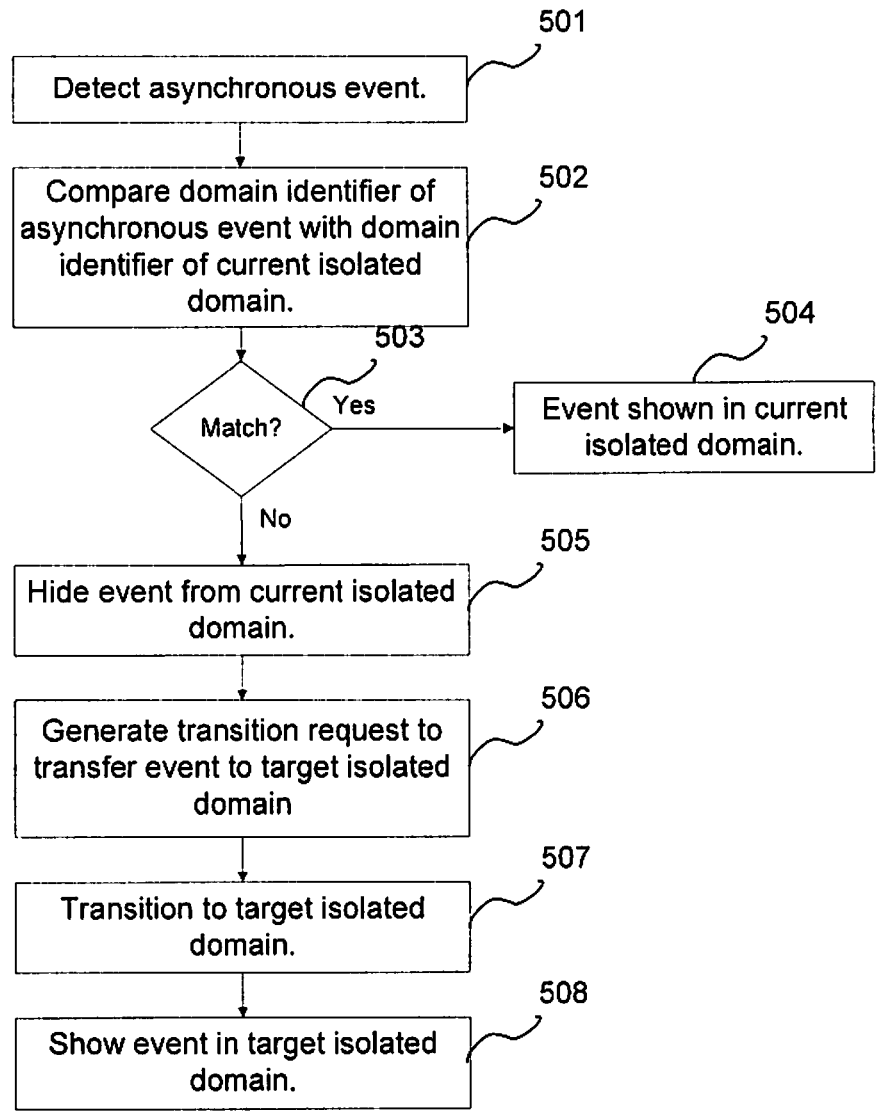
FIG. 5 is a flowchart illustrating an exemplary embodiment of the use of the domain identifier for asynchronous events.

FIG. 5 is a flowchart illustrating an exemplary embodiment of the use of the domain identifier for asynchronous events. When a hardware device 201 detects an asynchronous event (step 501), the hardware device 201 compares the domain identifier of the event with the domain identifier of the current isolated domain executing on an execution engine 202 (step 502). If they match (step 503), then the event is allowed to occur in the current isolated domain (step 504). If they do not match, then the event is hidden in the current isolated domain (step 505). The hardware device 201 then generates a transition request to the trusted domain 101 to transfer the asynchronous event to the target isolated domain (step 506). Code in the trusted domain 101 transitions the execution engine 202 to the target isolated domain (step 507). The event is then shown in the target isolated domain (step 508), in which the event is handled. The hardware device 201 compares the permissions of the physical addresses of the resources 206-207 with the domain identifier of the event to determine which resources the event can access, as described above with reference to FIG. 4.

In the exemplary embodiment, the transition to the target isolated domain comprises a series of operations carried out between two instructions with different domain identifiers on the same execution engine or set of engines. The transition code can be implemented in any one of a number of ways. For example, clean up code is run in the current isolated domain, followed by a run of set up code in the target isolated domain. The clean up code hides the current isolated domain's resources. Once the transition to the target isolated domain occurs, the set up code enables the target isolated domain's resources. For another example, a single code is run in the trusted domain 101 to disable the resources of the current isolated domain and to enable the resources of the target isolated domain.

In the exemplary embodiment, the transition code contains no operational code. The transition code only performs the transition from a current isolated domain to a target isolated domain. The operation of any instruction is then handled in the target isolated domain, not by the transition code.

For example, assume that a UART interrupt is configured to be taken in one isolated domain, DOMAIN1. Assume also that another isolated domain, DOMAIN2, is currently running on the execution engine 202. When the hardware device 201 detects the interrupt event (step 501), the hardware device 201 compares the domain identifier of the interrupt event, DOMAIN1, with the domain identifier of the currently running isolated domain, DOMAIN2 (step 502). Since they do not match (step 503), the interrupt event is hidden in DOMAIN2 (step 505). The hardware device 201 generates a transition request to the trusted domain 101 to transfer the interrupt event to DOMAIN1 (step 506). Code in the trusted domain 101 transitions the execution engine 202 from DOMAIN2 to DOMAIN1 (step 507). The interrupt event is then shown in DOMAIN1, which is then handled by the execution engine 202 (step 508). The hardware device 201 determines the permissions to access the physical addresses of the resources 206-207, as described above with reference to FIG. 4.

In some cases, it may be more expedient to place a resource "above" the point where the domain identifier tag is added to an instruction. For example, an initial design may wish to execute all instructions at the system-on-chip (SOC) level, thus avoiding modification of the core 200. Examples of such resources include caches and memory management unit/translation lookaside buffer (MMU/TLB), typically used in virtual address translation. If the execution engine 202 is executing one piece of code at a time, a register can be associated with the hardware device 201 for storing the domain identifier assigned to the code. The value in the register is logically attached to a group of instructions executed by the execution engine 202, rather that tagging each individual instruction. When the execution engine 202 transitions to a different isolated domain, the value in the register is changed to the domain identifier of that isolated domain.

If one or more of the caches in the processor core 200 are above the level where the domain identifier is added to an instruction, then when the execution engine 202 transitions to a different isolated domain, the cache is flushed of content belonging to the previously executing isolated domain. Flushing of the cache is required since access to the cache is not checked at this level. The flushing may be implemented in any number of ways, for example: defining only one isolated domain as cacheable; tagging cache contents to indicate which isolated domain the content belongs to, and the cache is selectively flushed for contents of a particular isolated domain; or completely flushing the cache.

Similar to the cache, the MMU/TLB can exist above the point where the domain identifier is added to an instruction. Direct modification to the MMU/TLB would be a secure operation and the address tables should either be secure or in the correct domain. As the domain identifier is used to determine permissions based on physical addresses rather than virtual addresses, there is no security breach if a TLB is "corrupted" to point to an undesirable address.

Although the exemplary embodiment is described above as a mechanism for securing access between codes in non-trusted domains for a processor core, the concept of multiple domains can be expanded to be an identifier for a task within the overall system. For example, the task may be to allocate bus bandwidth or processing time. This is normally done at the operating system level, but in this alternative embodiment, domains are used where there is more than one operating system running on the system. For example, a single digital signal processor (DSP) is used to perform multiple tasks, such as processing of multimedia and modem functions. Each task is assigned a different operating system or real-time operating system (RTOS), and is not allowed to occupy more than its allotted space on the system. Domains can be used at all levels of the system, such as allowing different fractions of a shared cache to be allocated to different tasks, different amount of bus bandwidth, etc. The domain identifier can also be used for prioritization of the tasks with the system.

A method and apparatus for providing security for codes running in non-trusted domains in a processor core have been disclosed. The method and apparatus configure a processor core to include a trusted domain and a plurality of isolated domains. Each of the isolated domains is assigned a unique domain identifier. One or more resources are associated with each of the isolated domains. The associations are stored as permissions to access the physical addresses of the resources. A code to be executed by a hardware device is associated with one of the isolated domains, and the unique domain identifier for the assigned isolated domain is written to the hardware device. When the hardware device executes the code, each instruction is logically tagged with the domain identifier written to the hardware device. The instruction is identifiable as a request to access a physical address of a resource. The hardware device compares the domain identifier of the instruction with the permissions of the physical address in the instruction. If the domain identifier of the instruction has permission to access this physical address, then access to the resource at the physical address is allowed. Access to the resource is otherwise blocked. In this manner, codes assigned to different isolated domains can run independently within the same processor core without interference from each other. Further, since the permissions are configured based on the physical addresses of the resources, concerns related to software-based security mechanisms are not relevant.

The invention has been described in accordance with the embodiments shown, and one of ordinary skill in the art will readily recognize that there could be variations to the embodiments, and any variations would be within the spirit and scope of the invention. For example, the invention can be implemented using hardware, software, a computer readable medium containing program instructions, or a combination thereof. Software written according to the invention is to be either stored in some form of computer-readable medium such as memory CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

I claim:

1. A method for providing security within non-trusted domains, the method comprising:
    configuring (i) a trusted domain and (ii) a plurality of isolated domains;
    assigning each of the plurality of isolated domains a unique domain identifier;
    associating one or more resources with each of the plurality of isolated domains;
    storing the associations as permissions to access physical addresses of the one or more resources;
    assigning code to one of the plurality of isolated domains, wherein the code is to be executed by a hardware device, wherein the code comprises instructions, wherein each of the instructions describes only a single operation to be performed by the hardware device, and wherein the permissions include identifiers of domains permitted access to one or more of the physical addresses in each of the instructions;
    writing the unique domain identifier for the assigned one of the plurality of isolated domains to the hardware device, wherein, during execution of the code by the hardware device, each of the instructions in the code is logically tagged with the written unique domain identifier, and wherein bits are added to each of the instructions when logically tagged, and the bits are sent on a system bus and identify the written unique domain identifier of a corresponding one of the instructions; and
    permitting access to the one or more resources (i) according to each of the instructions, and (ii) based on a comparison between the written unique domain identifier of a corresponding one of the instructions and the permissions.

2. The method of claim 1, wherein separate pieces of the code to be executed on a processor core are assigned to different isolated domains.

3. The method of claim 1, wherein the trusted domain is able to access all of the one or more resources.

4. The method of claim 1, wherein each of the plurality of isolated domains is only able to access resources of the one or more resources associated with a corresponding one of the isolated domains.

5. The method of claim 3, further comprising executing code in the trusted domain to (i) configure the plurality of isolated domains, (ii) configure the permissions, (iii) assign the one of the plurality of isolated domains to the code, and (iv) write the unique domain identifier of the assigned isolated domain to the hardware device.

6. The method of claim 1, wherein one of the instructions comprises a request to access a physical address, and wherein the method further comprises:
    comparing the unique domain identifier of the one of the instructions to the permissions of the physical address in the one of the instructions; and
    allowing access to the resource at the physical address in the one of the instructions, if the unique domain identifier of the one of the instructions has permitted access to the resource at the physical address in the one of the instructions.

7. The method of claim 6, further comprising blocking access to the resource at the physical address in the one of the instructions, if the unique domain identifier of the one of the instructions does not have permitted access to the resource at the physical address in the one of the instructions.

8. The method of claim 1, further comprising:
    executing code in a current isolated domain via an execution engine of the hardware device;
    detecting, by the hardware device, an asynchronous event, wherein the asynchronous event is tagged with a domain identifier;
    comparing the domain identifier of the asynchronous event with a domain identifier of a current isolated domain; and
    in response to the domain identifier of the asynchronous event not matching the domain identifier of the current isolated domain,
        hiding the asynchronous event from the current isolated domain,
        generating a transition request to transfer the execution engine from the current isolated domain to a target isolated domain, wherein the target isolated domain is associated with the domain identifier of the asynchronous event, and
        subsequent to transitioning the execution engine to the target isolated domain, showing the asynchronous event in the target isolated domain.

9. The method of claim 8, wherein in response to the domain identifier of the asynchronous event not matching the domain identifier of the current isolated domain, the method further comprises transitioning to the target isolated domain via the execution engine, wherein the transitioning to the target isolated domain comprises:
    running clean up code in the current isolated domain, wherein the clean up code hides resources of the one or more resources associated with the current isolated domain; and
    running set up code in the target isolated domain, wherein the set up code enables resources of the one or more resources associated with the target isolated domain.

10. The method of claim 9, wherein in response to the domain identifier of the asynchronous event not matching the domain identifier of the current isolated domain, the method further comprises transitioning the execution engine to the target isolated domain based on the code, wherein the transitioning the execution engine to the target isolated domain comprises:
    disabling the resources of the one or more resources associated with the current isolated domain; and
    enabling the resources of the one or more resources associated with the target isolated domain.

11. The method of claim 1, wherein each of the permissions is assigned to one of the plurality of isolated domains.

12. The method of claim 1, wherein the permitted access to the one or more resources is determined based on a comparison between an address request of the one of the instructions and permissions associated with the written unique domain identifier.

13. The method of claim 1, wherein the permitted access to the one or more resources is determined based on a comparison between a requested address of the one of the instructions and addresses of the permissions associated with the written unique domain identifier.

14. The method of claim 1, further comprising:
    identifying resource addresses accessible to the assigned one of the plurality of isolated domains based on the written unique domain identifier;

comparing an address request of the one of the instructions to the resource addresses; and permitting access to a resource in the assigned one of the plurality of isolated domains based on the comparing of the address request to the resource addresses.

15. The method of claim 1, wherein a first one of the plurality of isolated domains includes a same one of the one or more resources as a second one of the plurality of isolated domains.

16. The method of claim 1, wherein:
the code is associated with the written unique domain identifier; and
another code is associated with another unique domain identifier of one of the plurality of isolated domains.

17. The method of claim 16, wherein the written unique domain identifier and the another unique domain identifier share a resource.

18. The method of claim 1, wherein:
the one or more resources comprise a memory and input and output devices;
the memory and input and output devices are each directly connected to the system bus;
each of the physical addresses of the instructions identifies one of the memory and input and output devices; and
the hardware device communicates with the one or more resources via the system bus.

19. A system, comprising:
a plurality of resources, wherein each of the plurality of resources is accessible at a physical address;
a hardware device configured to execute code; and
a trusted domain and a plurality of isolated domains, wherein
each of the plurality of isolated domains is assigned a unique domain identifier,
one or more of the plurality of resources are associated with each of the plurality of isolated domains,
the associations are stored as permissions to access the physical addresses of the plurality of resources,
the code comprises instructions and is assigned to one of the plurality of isolated domains, wherein each of the instructions describes only a single operation to be performed by the hardware device,
the permissions include identifiers of domains permitted access to one or more of the physical addresses in each of the instructions,
the unique domain identifier for the assigned one of the plurality of isolated domains is written to the hardware device,
the hardware device, during execution of the code, logically tags each of the instructions with the written unique domain identifier, wherein the logically tagging of each of the instructions includes adding bits to each of the instructions, and wherein the bits of each of the instructions are sent on a system bus and identify the written unique domain identifier of a corresponding one of the instructions, and
the hardware device is configured to access the plurality of resources (i) according to each of the instructions and (ii) based on a comparison between the written unique domain identifier of a corresponding one of the instructions and the permissions.

20. The system of claim 19, wherein the trusted domain is able to access all of the plurality of resources.

21. The system of claim 19, wherein each of the plurality of isolated domains is only able to access resources of the plurality of resources associated with a corresponding one of the isolated domains.

22. The system of claim 19, wherein the hardware device is configured to execute the code in the trusted domain to (i) configure the plurality of isolated domains, (ii) configure the permissions, (iii) assign the one of the plurality of isolated domains to the code, and (iv) write the unique domain identifier of the assigned one of the plurality of isolated domains to the hardware device.

23. The system of claim 19, wherein:
one of the instructions comprises a request to access a physical address; and
during execution of the code, the hardware device is configured to
compare the unique domain identifier in the one of the instructions to the permissions of the physical address in the one of the instructions, and
allow access to a resource of the plurality of resources at the physical address in the one of the instructions if the unique domain identifier of the one of the instructions has permitted access to the resource of the plurality of resources.

24. The system of claim 23, wherein access to the resource at the physical address in the one of the instructions is blocked if the unique domain identifier of the one of the instructions does not have permitted access to the resource of the plurality of resources.

25. The system of claim 19, wherein:
the hardware device comprises an execution engine;
the execution engine is configured to execute code in a current isolated domain; and
the hardware device is configured to
detect an asynchronous event tagged with a domain identifier,
compare the domain identifier of the asynchronous event to a domain identifier of the current isolated domain, and
in response to the domain identifier of the asynchronous event not matching the domain identifier of the current isolated domain,
hide the asynchronous event from the current isolated domain,
generate a transition request to transfer the execution engine from the current isolated domain to a target isolated domain associated with the domain identifier of the asynchronous event, and
subsequent to the execution engine transitioning to the target isolated domain, show the asynchronous event in the target isolated domain.

26. The system of claim 25, wherein, in response to the domain identifier of the asynchronous event not matching the domain identifier of the current isolated domain, the execution engine is configured to:
execute a clean up code in the current isolated domain to transition to the target isolated domain;
execute the clean up code to hide resources of the plurality of resources associated with the current isolated domain; and
execute a set up code in the target isolated domain, wherein the set up code enables resources of the plurality of resources associated with the target isolated domain.

27. The system of claim 25, wherein the execution engine is configured to execute code in the trusted domain to transition the execution engine to the target isolated domain including (i) disabling resources of the plurality of resources associated with the current isolated domain and (ii) enabling the resources associated with the target isolated domain.

* * * * *